US012652620B2

(12) United States Patent
Xu et al.

(10) Patent No.: US 12,652,620 B2
(45) Date of Patent: Jun. 9, 2026

(54) COLLISION HANDLING FOR WAKEUP SIGNAL (WUS)

(71) Applicant: QUALCOMM Incorporated, San Diego, CA (US)

(72) Inventors: Huilin Xu, Temecula, CA (US); Ahmed Elshafie, San Diego, CA (US); Diana Maamari, San Diego, CA (US); Wanshi Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 816 days.

(21) Appl. No.: 17/816,351

(22) Filed: Jul. 29, 2022

(65) Prior Publication Data

US 2024/0049140 A1 Feb. 8, 2024

(51) Int. Cl.
*H04W 4/00* (2018.01)
*H04W 52/02* (2009.01)

(52) U.S. Cl.
CPC ............................... *H04W 52/0274* (2013.01)

(58) Field of Classification Search
CPC .................................................. H04W 52/0274
See application file for complete search history.

(56) References Cited

U.S. PATENT DOCUMENTS

| | | | | |
|---|---|---|---|---|
| 2008/0261628 A1* | 10/2008 | Proctor | ............. | H04W 52/0216 455/458 |
| 2014/0328271 A1 | 11/2014 | Chen et al. | | |
| 2016/0105835 A1* | 4/2016 | Chin | .................... | H04W 84/12 370/331 |

| | | | | |
|---|---|---|---|---|
| 2017/0094660 A1 | 3/2017 | Frederiksen et al. | | |
| 2018/0249412 A1* | 8/2018 | Zhou | ................ | H04W 52/0225 |
| 2018/0288703 A1 | 10/2018 | Sun et al. | | |
| 2019/0373666 A1* | 12/2019 | Khan | .................. | G06F 9/45558 |
| 2020/0178171 A1* | 6/2020 | Lou | .................... | H04W 52/0216 |
| 2020/0314747 A1* | 10/2020 | Zhou | .................... | H04W 52/143 |
| 2020/0344684 A1* | 10/2020 | Rantala | ................. | H04W 52/02 |
| 2021/0274483 A1* | 9/2021 | Zhang | .................. | H04L 5/1469 |
| 2021/0321446 A1* | 10/2021 | Lee | .......................... | H04L 5/005 |
| 2022/0240166 A1* | 7/2022 | Balaji | .............. | H04W 72/0446 |
| 2023/0066679 A1* | 3/2023 | Xu | ......................... | H04W 72/23 |
| 2024/0147362 A1* | 5/2024 | Thyagarajan | ..... | H04W 52/0229 |
| 2024/0196328 A1* | 6/2024 | He | .......................... | H04W 76/28 |
| 2024/0196469 A1* | 6/2024 | Oteri | ..................... | H04W 76/27 |

OTHER PUBLICATIONS

Blobel et al., Low-Power Downlink for the Internet of Things using IEEE 802.11-compliant Wake-Up Receivers, IEEE Infocom 2021, pp. 1-10. (Year: 2021).*
International Search Report and Written Opinion—PCT/US2023/027733—ISA/EPO—Nov. 9, 2023.

* cited by examiner

*Primary Examiner* — Elisabeth Benoit Magloire
(74) *Attorney, Agent, or Firm* — Procopio, Cory, Hargreaves & Savitch LLP

(57) ABSTRACT

A user equipment (UE) may identify, while a second radio of the UE is on, a potential communication associated with a first radio of the UE. The potential communication may be independent from an indication received via the second radio. The UE may select whether to execute the potential communication. Executing the potential communication may be associated with switching on the first radio. A single radio between the first radio and the second radio may be switched on at a time. The first radio of the UE may be a main radio. The second radio of the UE may be a wakeup receiver.

30 Claims, 10 Drawing Sheets

700

702 identify, while a second radio of the UE is on, a potential communication associated with a first radio of the UE, the potential communication being independent from an indication received via the second radio

704 select whether to execute the potential communication, executing the potential communication being associated with switching on the first radio, wherein a single radio between the first radio and the second radio is switched on at a time

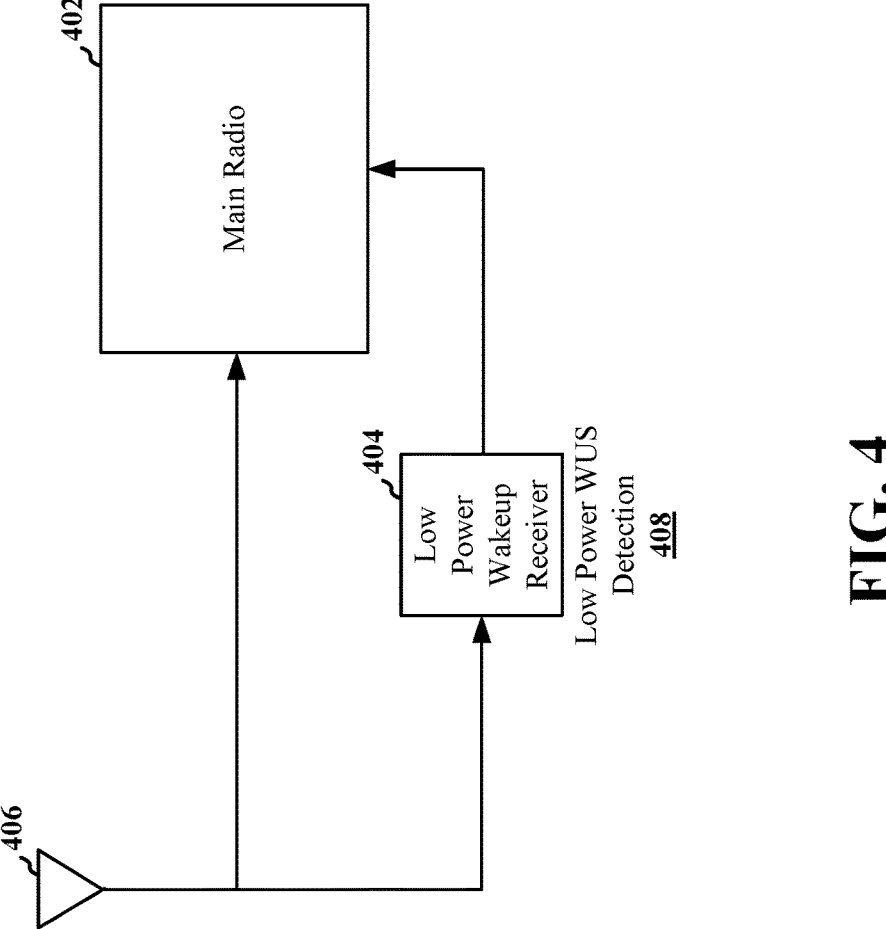
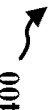
FIG. 4

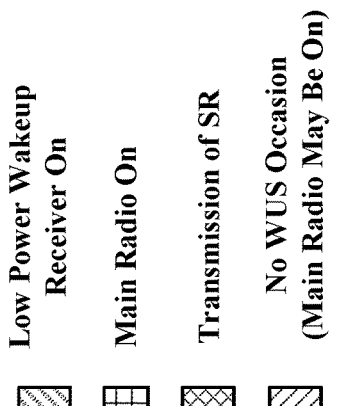
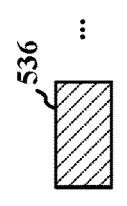
FIG. 5

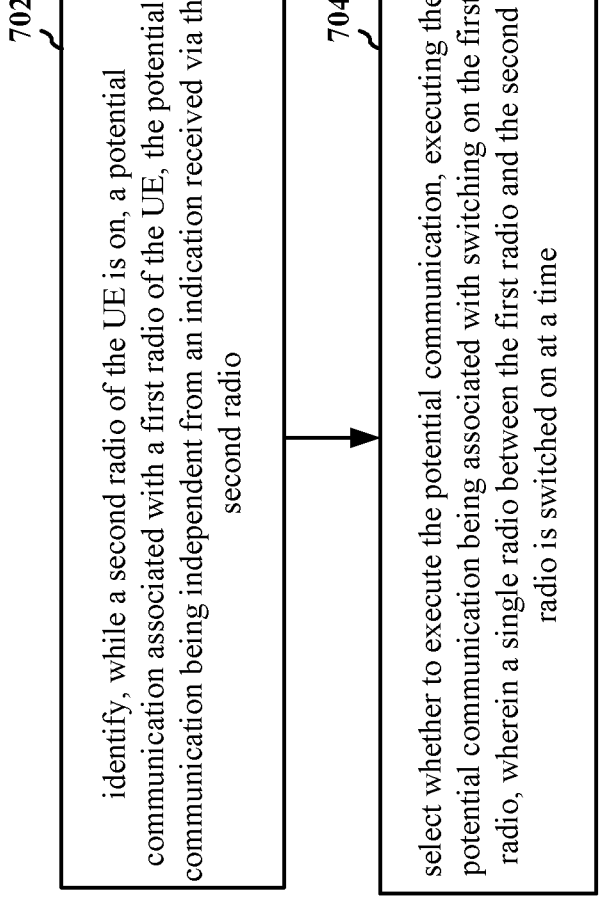

702 identify, while a second radio of the UE is on, a potential communication associated with a first radio of the UE, the potential communication being independent from an indication received via the second radio

704 select whether to execute the potential communication, executing the potential communication being associated with switching on the first radio, wherein a single radio between the first radio and the second radio is switched on at a time

COLLISION HANDLING FOR WAKEUP SIGNAL (WUS)

TECHNICAL FIELD

The present disclosure relates generally to communication systems, and more particularly, to the wakeup signal (WUS) in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may identify, while a second radio of the UE is on, a potential communication associated with a first radio of the UE. The potential communication may be independent from an indication received via the second radio. The apparatus may select whether to execute the potential communication. Executing the potential communication may be associated with switching on the first radio. A single radio between the first radio and the second radio may be switched on at a time.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 4 is a block diagram illustrating example radios in a UE according to one or more aspects of the disclosure.

FIG. 5 is a diagram illustrating example timelines associated with the transmission of a scheduling request according to one or more aspects of the disclosure.

FIG. 7 is a flowchart of a method of wireless communication.

DETAILED DESCRIPTION

Figure 1:
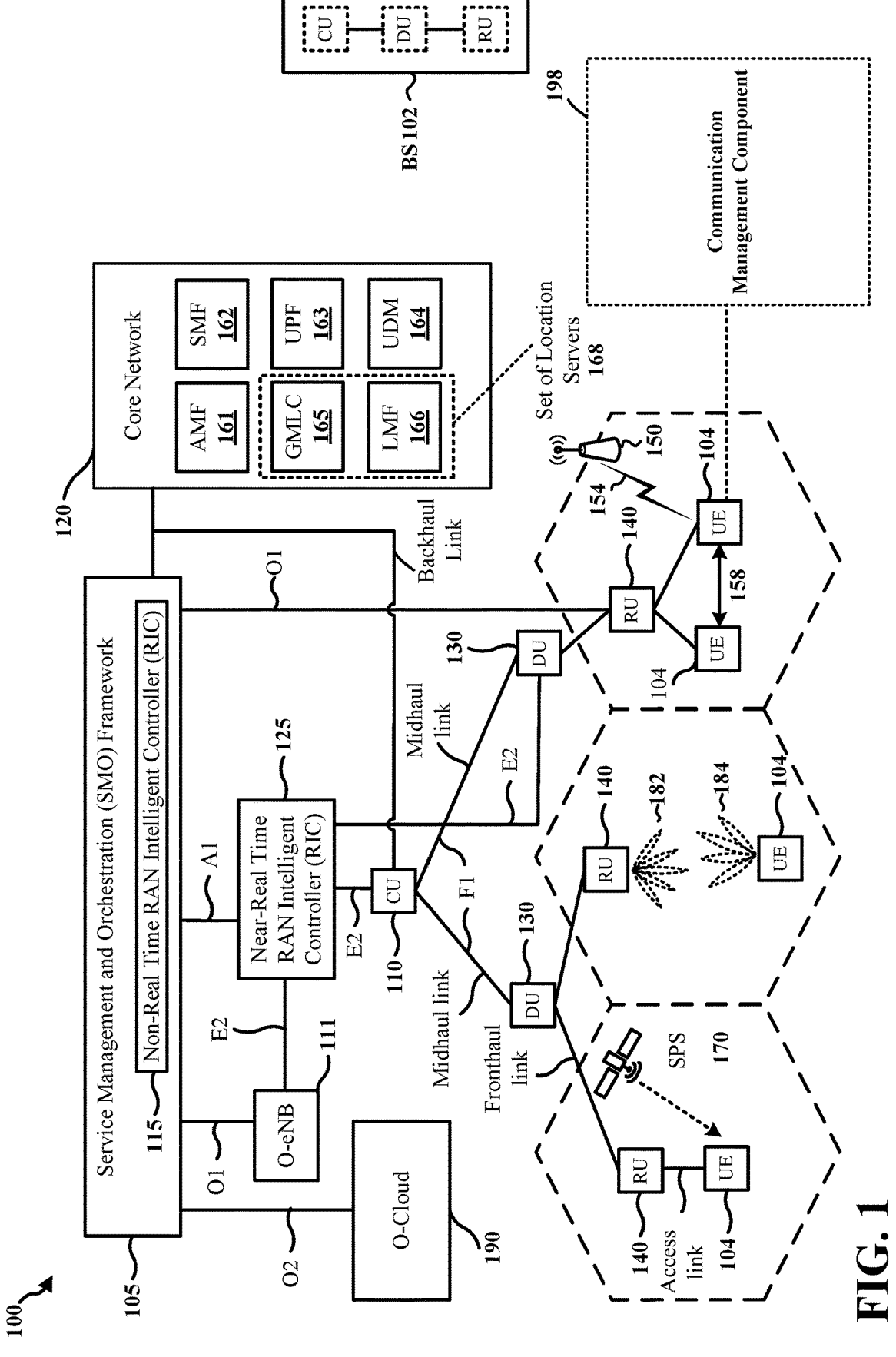
FIG. 1 is a diagram illustrating an example of a wireless communications system and an access network.

A low power WUS may be used to indicate the random data arrival time and/or whether there is data scheduling for the UE in the upcoming discontinuous reception (DRX) cycle. To achieve both purposes, a unified UE design including both a main radio and a low power wakeup receiver may be used. In particular, the UE may continuously monitor for the low power WUS using the low power wakeup receiver. The main radio of the UE may be switched off while the UE monitors for the low power WUS. Once a low power WUS is detected, the UE may switch on the main radio (and switch off the low power wakeup receiver) to communicate with the network node as normal. For example, after the main radio is switched on, the UE may receive a scheduling physical downlink control channel (PDCCH)/downlink control information (DCI) message, and may exchange data (in UL and/or DL) with the network node based on the scheduling information. However, there may be collisions between the low power WUS monitoring and other potential wireless communications because the main radio is switched off when the UE monitors for the low power WUS using the low power wakeup receiver. For example, a collision may occur if there is UL interruption to the low power WUS monitoring. In another example, a collision may occur if there is a conflict between operations configured at a higher layer (e.g., radio resource control (RRC) configured operations), such as communications based on semi-persistent scheduling (SPS) or the configured grant (CG), and the low power WUS monitoring.

A UE may identify, while a second radio of the UE is on, a potential communication associated with a first radio of the UE. The potential communication may be independent from an indication received via the second radio. The UE may select whether to execute the potential communication. Executing the potential communication may be associated with switching on the first radio. A single radio between the first radio and the second radio may be switched on at a time. The first radio of the UE may be a main radio. The second radio of the UE may be a wakeup receiver. Accordingly, collisions between WUS monitoring and wireless communications via the main radio may be resolved based on one or more factors and/or criteria. Further, the power savings associated with the low power wakeup receiver architecture may be realized.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL- TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a communication management component 198 that may be configured to identify, while a second radio of the UE is on, a potential communication associated with a first radio of the UE. The potential communication may be independent from an indication received via the second radio. The communication management component 198 may be configured to select whether to execute the potential communication. Executing the potential communication may be associated with switching on the first radio. A single radio between the first radio and the second radio may be switched on at a time. Although the following description may be focused on 5G NR, the concepts described herein may be applicable to other similar areas, such as LTE, LTE-A, CDMA, GSM, and other wireless technologies.

Figures 2A, 2B, 2C, 2D:
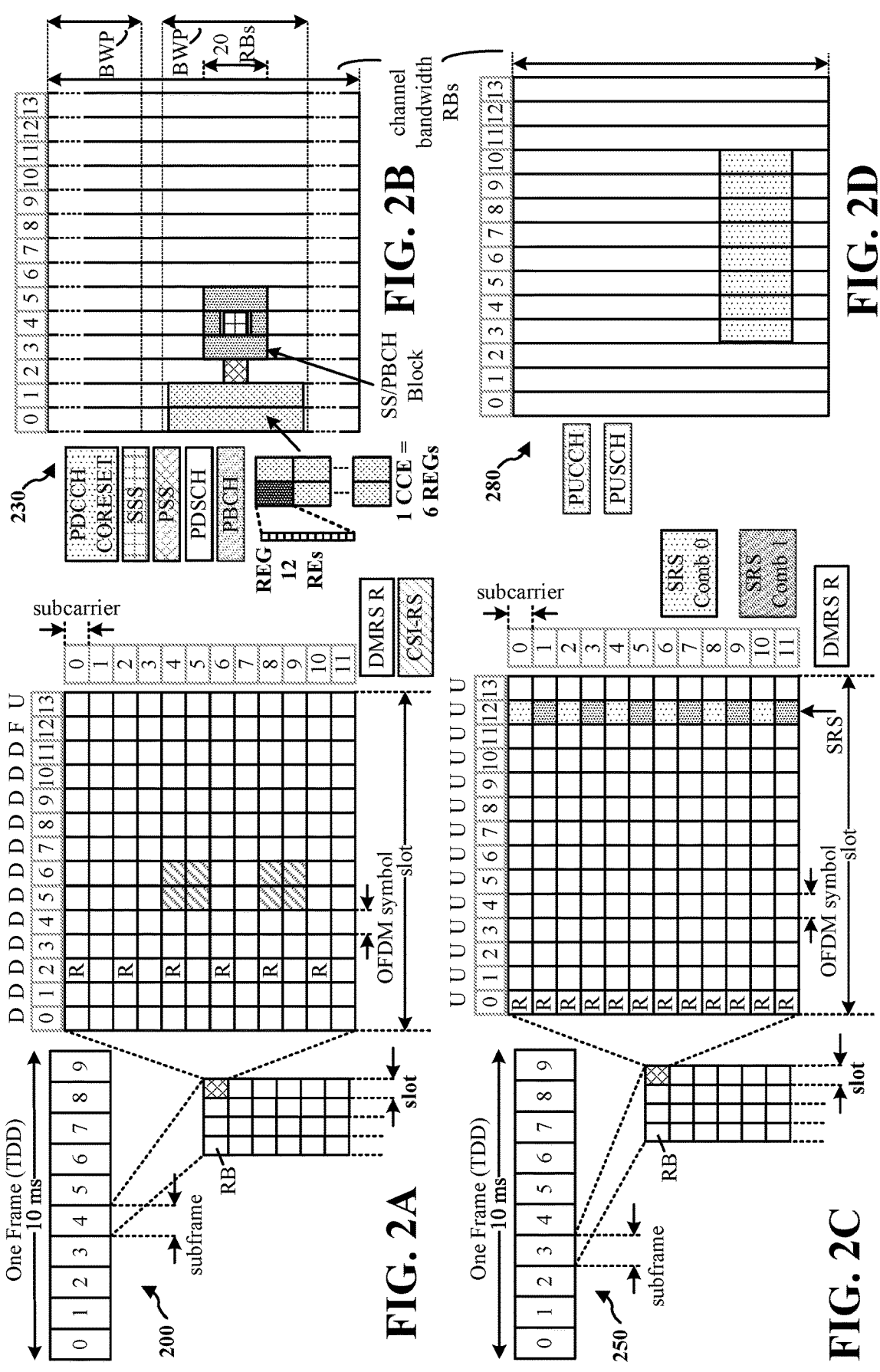
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| μ | SCS $\Delta f = 2^\mu \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 2 slots/subframe. The subcarrier spacing may be equal to 2*15 kHz, where y is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
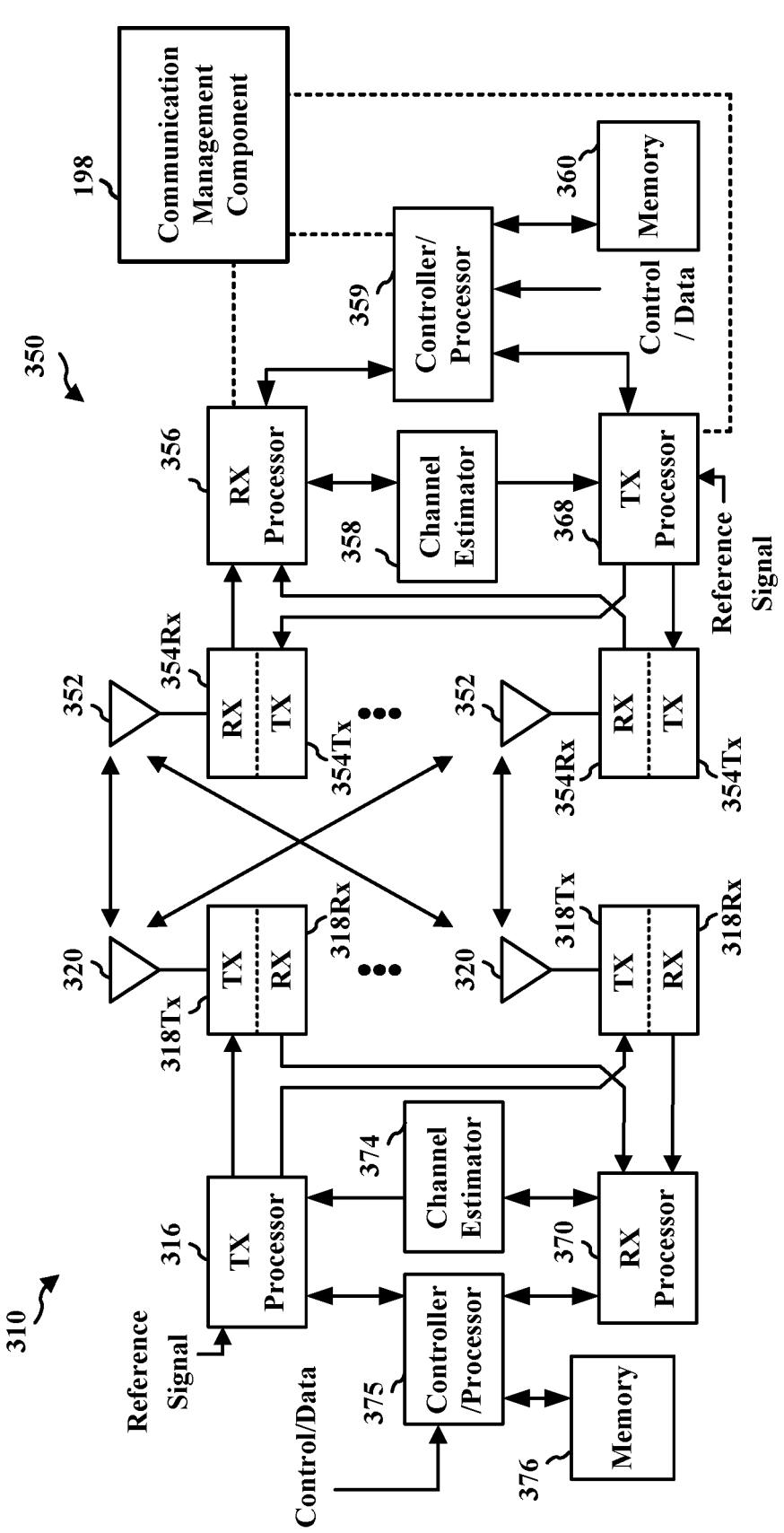
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/ processor 375 is also responsible for error detection using an ACK and/or NACK protocol to support HARQ operations.

At least one of the TX processor 368, the RX processor 356, and the controller/processor 359 may be configured to perform aspects in connection with the communication management component 198 of FIG. 1.

The wakeup signal may be used to indicate to a UE whether there is data scheduling for the UE (e.g., whether there are DCI messages scheduling UL or DL transmissions for the UE) in the upcoming DRX on duration. If the WUS is based on the PDCCH design (e.g., WUS via PDCCH), the UE may save power if the UE does not always receive scheduling information (i.e., DCI messages scheduling UL or DL transmissions) in the DRX cycle. Moreover, if the data arrival time is known to the network node (e.g., the base station) at the beginning of the DRX on duration, the network may use cross-slot scheduling and PDCCH skipping between the scheduling DCI message and the scheduled data to achieve similar effects (e.g., similar power savings) as the WUS PDCCH. Furthermore, if the data arrival time is unknown to the network node at the beginning of the DRX on duration, the network may just send the scheduling DCI message to the UE whenever suitable. Transmitting the scheduling DCI message to the UE whenever suitable may be even more power efficient for the UE than using the WUS PDCCH because extra power may be consumed for decoding the WUS PDCCH at the UE.

Another approach to the WUS may be based on a low power design. In particular, the UE may be equipped with low power consumption radio hardware to detect the low power WUS (e.g., the sequence-based WUS), where the low power consumption radio hardware may be separate from the main radio and may consume much less power than the main radio (e.g., the low power consumption radio hardware may consume 1/100 of the power consumed by the main radio for communications). With the use of the separate low power consumption radio hardware, the overall power saving may be significantly improved. The low power WUS may be used to indicate whether data is scheduled for the UE in the upcoming DRX on duration or a random data arrival time, as the case may be. Without the low power WUS, the UE may need to detect and decode the PDCCH to learn whether data is scheduled for the UE in the upcoming DRX on duration or the random data arrival time. Accordingly, if the low power WUS is available, the connected mode DRX may be fully replaced by a low power WUS based implementation, where the UE may receive the scheduling PDCCH based on the indication conveyed by the low power WUS. In other words, the UE may keep monitoring for the low power WUS using the low power consumption radio hardware and may, based on the indication conveyed by the low power WUS, switch on the main radio (and switch off the low power consumption radio hardware) at the time when there is a scheduling PDCCH for the UE.

FIG. 4 is a block diagram 400 illustrating example radios in a UE according to one or more aspects of the disclosure. The UE may include a main radio 402 for regular wireless communications and a low power wakeup receiver 404. Both the main radio 402 and the low power wakeup receiver 404 may be connected to one or more antennas 406 of the UE. The low power wakeup receiver 404 may correspond to a radio unit separate from the main radio 402 and may correspond to the low power consumption radio hardware described above. Accordingly, the low power wakeup receiver 404 may perform low power WUS detection 408. Based on the indication conveyed by the low power WUS, the UE may switch on the main radio 402 (and switch off the low power wakeup receiver 404) to receive a scheduling PDCCH/DCI message and/or to execute other wireless communication tasks. In some configurations herein, the main radio 402 and the low power wakeup receiver 404 may not be switched on at the same time. In other words, a single radio between the main radio 402 and the low power wakeup receiver 404 may be switched on at a time. If the UE switches on the main radio 402, the UE may at the same time switch off the low power wakeup receiver 404. Similarly, if the UE switches on the low power wakeup receiver 404, the UE may at the same time switch off the main radio 402. The UE may not be able to perform regular wireless communications when the main radio 402 is switched off, and may not be able to perform low power WUS detection 408 when the low power wakeup receiver 404 is switched off.

In different aspects, the virtual reality (VR), augmented reality (AR), or extended reality (XR) video communication may be characterized by a high throughput (e.g., 30 Mbps or 45 Mbps for the video transfer), a tight latency specification (e.g., a 10 ms packet delay budget (PDB) before the video frame expires), and a random data arrival time (which may be caused by the adaptive video compression algorithm and/or the data transfer through the application server and the RAN).

The low power wakeup receiver architecture may be especially useful for VR/AR/XR video commutation because the low power WUS may be used to indicate the random data arrival time (which may be due to jitter) and/or whether there is data scheduling for the UE in the upcoming DRX cycle. To achieve both purposes, a unified UE design including both a main radio (e.g., the main radio 402) and a low power wakeup receiver (e.g., the low power wakeup receiver 404) may be used. In particular, the UE may continuously monitor for the low power WUS using the low power wakeup receiver. The main radio of the UE may be switched off while the UE monitors for the low power WUS. Once a low power WUS is detected, the UE may switch on the main radio (and switch off the low power wakeup receiver) to communicate with the network node as normal. For example, after the main radio is switched on, the UE may receive a scheduling PDCCH/DCI message, and may exchange data or reference signals (in UL and/or DL) with the network node based on the scheduling information. However, there may be collisions between the low power WUS monitoring and other potential wireless communications because the main radio is switched off when the UE monitors for the low power WUS using the low power wakeup receiver. For example, a collision may occur if there is transmission via the main radio that interrupts the low power WUS monitoring. In another example, a collision may occur if there is a conflict between operations configured at a higher layer (e.g., RRC configured operations), such as communications based on SPS or the CG, and the low power WUS monitoring.

As described above, the low power wakeup receiver and the main radio of the UE may correspond to separate hardware, and may be individually switched on or off. For reasons including saving power, reducing hardware cost and/or reducing implementation difficulty, at any time a single radio/receiver between the low power wakeup receiver and the main radio may be switched on (activated). In general, the UE may switch on the main radio if the low power wakeup receiver detects a WUS prompting the UE to switch on the main radio to perform a wireless communication (e.g., the WUS may convey an indication of an upcoming wireless communication that may be executed using the main radio).

In one configuration, the UE may need to initiate a UL transmission without having received any indication from the network node via a WUS. For example, the application layer at the UE may have a data packet to transmit to the network and the UE may need to first request resources by sending a scheduling request on the UL. Therefore, the UE may need to switch on the main radio in order to transmit the scheduling request. However, switching on the main radio may interrupt or interfere with the WUS monitoring by the low power wakeup receiver because the low power wakeup receiver may be switched off at the time the main radio is switched on. Therefore, if the network node transmits a WUS to the UE during the period when the main radio is switched on by the UE autonomously to transmit the scheduling request, the UE may miss the WUS and the associated scheduling PDCCH indicated by the WUS.

FIG. 5 is a diagram 500 illustrating example timelines associated with the transmission of a scheduling request according to one or more aspects of the disclosure. For a UE including a wakeup receiver and a main radio that correspond to separate hardware, the UE may switch from the wakeup receiver to the main radio (i.e., switch on the main radio and switch off the wakeup receiver) autonomously, for example, when the UE intends to initiate a UL transmission to the network. In different configurations, the UE may perform different operations associated with the switch to the main radio. In one configuration, as shown at 510, after switching to the main radio (i.e., switching on the main radio and switching off the wakeup receiver) in order to transmit the scheduling request 512 (or some other transmission), the UE may keep the main radio on (awake). In some configurations, if the UE receives (e.g., after the communication via the main radio is completed), from the network node, an indication signaling the UE to switch to the wakeup receiver (i.e., switch on the wakeup receiver and switch off the main radio), the UE may switch to the wakeup receiver in response to the indication from the network node.

In another configuration, as shown at 520, after switching to the main radio to transmit the scheduling request 522 (or some other transmission), the UE may keep the main radio on (awake) for a predetermined duration (e.g., a maximum duration 524). After the predetermined duration (e.g., a maximum duration 524) has expired, the UE may switch to the wakeup receiver. The network node in communication with the UE may have enough time for receiving the scheduling request 522 to learn that the UE has autonomously switched the main radio on. In some configurations, before the predetermined duration (e.g., a maximum duration 524) expires, the network node may signal the UE (e.g., using a signaling indication) to switch to the wakeup receiver.

In some configurations, if the UE receives a scheduling PDCCH within the predetermined duration, the UE may keep the main radio on, and may communicate with the network node based on the scheduling information included in the scheduling PDCCH. If the communication with the network node is completed before the predetermined duration (e.g., a maximum duration 524) expires, the UE may continue to wait for the expiration of the predetermined duration (e.g., a maximum duration 524) before switching to the wakeup receiver. On the other hand, if the communication with the network node is not completed before the predetermined duration (e.g., a maximum duration 524) expires, the UE may keep the main radio on past the expiration of the predetermined duration in order to complete the communication. The UE may switch to the wakeup receiver after the communication with the network node is completed if the preconfigured duration has expired.

In yet another configuration, as shown at 530, multiple occasions 536 (each occasion 536 may correspond to a number of symbols/slots) may be preconfigured where the network node may not transmit the WUS during the preconfigured occasions 536. Accordingly, if the UE intends to transmit a scheduling request 532 (or some other transmission), the UE may autonomously switch to (activate) the main radio during one of the preconfigured occasions 536 to transmit the scheduling request 532 (or some other transmission). The UE may switch back to the wakeup receiver once the transmission is completed (e.g., before the expiration of the current occasion 536). In some configurations, the multiple occasions 536 may be periodic occasions (i.e., the occasions 536 may be associated with a periodicity). For example, the period between two adjacent occasions 536 may be a period 534. In some configurations, the occasions 536 may be associated with a start offset within the period.

In some configurations, during an occasion 536, the UE may switch on (activate) the main radio based on an indication from the network node.

In some aspects, the low power WUS may be suitable for dynamically scheduling or triggering data channels or reference signals. In other words, when the network node would like the UE to dynamically transmit or receive a channel or a reference signal, the network node may use the WUS to signal the UE to switch on the main radio and communicate with the network node using the main radio.

In some configurations, there may be collisions between WUS monitoring and (potential) transmissions or receptions configured in a higher layer (e.g., RRC configured transmissions or receptions), such as periodic communications, communications based on SPS, or communications based on the CG, where the transmissions or receptions may correspond to data and/or signals (e.g., signals for measurement, positioning, and/or sensing, etc.). The UE may resolve the collisions in various ways.

In one configuration, if the wakeup receiver of the UE is on (active) and the main radio of the UE is off (in sleep), and there is a higher layer (e.g., RRC) configured occasion for transmission or reception using the main radio, the UE may keep the wakeup receiver on and may ignore the higher layer configured occasion for transmission or reception.

In one configuration, if the wakeup receiver of the UE is on and the main radio of the UE is off, and there is a higher layer (e.g., RRC) configured occasion for transmission or reception using the main radio, the UE may switch on (wake up) the main radio to transmit or receive at the occasion based on the higher layer configuration. Further, in some configurations, the network node may avoid transmitting a WUS at the occasion.

However, for an occasion configured for a potential UL transmission, if the UE does not have data to transmit at the occasion, the UE may keep the wakeup receiver on and may not switch on the main radio for the occasion. Accordingly, if appropriate (e.g., there is an upcoming scheduling PDCCH for the UE), the network node may still transmit a WUS to the UE within the occasion.

In some configurations, for collisions between WUS monitoring and the higher layer configured transmission or reception of data or signals, the UE may select, based on a configuration received from the network node, between 1) keeping the wakeup receiver on and ignoring the higher layer configured transmission or reception or 2) switching to the main radio and performing the higher layer configured transmission or reception. In some other configurations, for collisions between WUS monitoring and the higher layer configured transmission or reception of data or signals, the UE may autonomously select between 1) keeping the wakeup receiver on and ignoring the higher layer configured transmission or reception or 2) switching to the main radio and performing the higher layer configured transmission or reception. In general, the UE may select to keep the wakeup receiver on and ignore the higher layer configured transmission or reception if the priority associated with the higher layer configured transmission or reception is low (e.g., less than a threshold). On the other hand, the UE may select to switch to the main radio and perform the higher layer configured transmission or reception if the priority associated with the higher layer configured transmission or reception is high (e.g., greater than a threshold). Further, the UE may report the expected behavior of the UE in relation to the resolution of the collisions between WUS monitoring and the higher layer configured transmission or reception (e.g., keep the wakeup receiver on or switch to the main radio) to the network (e.g., via capability signaling).

In one configuration, the configuration from the network node or the report from the UE associated with the UE behavior configuration in relation to the resolution of the collisions between WUS monitoring and the higher layer configured transmission or reception (e.g., keep the wakeup receiver on or switch to the main radio) may apply to all higher layer configured transmissions or receptions of data or signals for the UE. In another configuration, the configuration from the network node or the report from the UE associated with the UE behavior configuration in relation to the resolution of the collisions between WUS monitoring and the higher layer configured transmission or reception (e.g., keep the wakeup receiver on or switch to the main radio) may apply to one or more individual higher layer configured transmissions or receptions of data or signals for the UE. Therefore, for the different higher layer configured transmissions or receptions of data or signals for the UE, multiple configurations or reports may be possible.

Figure 6:
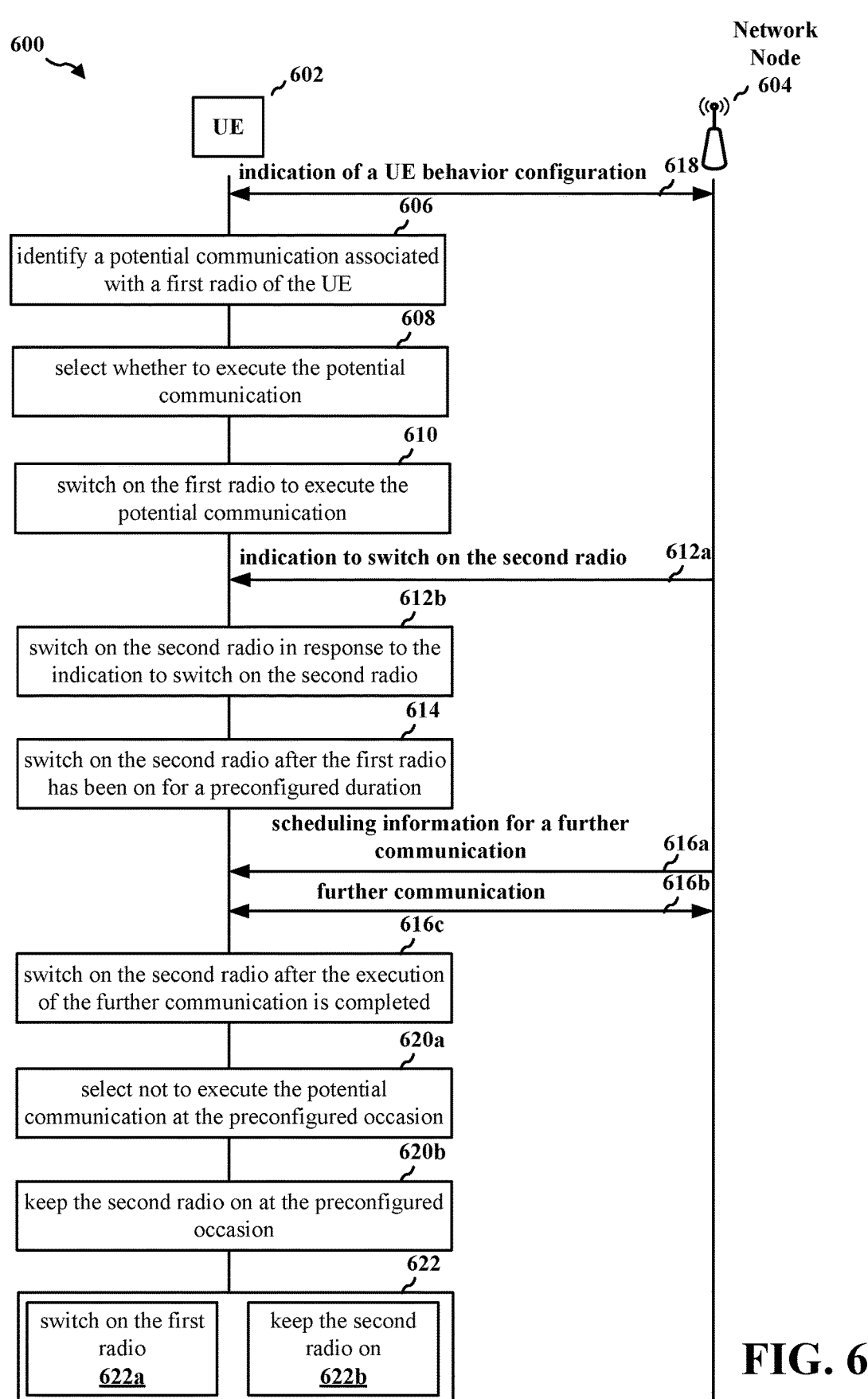
FIG. 6 is a diagram of a communication flow of a method of wireless communication.

FIG. 6 is a diagram of a communication flow 600 of a method of wireless communication. In one configuration, at 618, the UE 602 may transmit a first indication of a UE behavior configuration associated with the potential communication to a network node 604, or may receive a second indication of the UE behavior configuration associated with the potential communication from the network node 604. In one configuration, the UE behavior configuration may be associated with all communications associated with the UE that are RRC configured. In one configuration, the UE behavior configuration may be associated with one or more individual communications associated with the UE that are RRC configured. In one or more configurations, the potential communication may be one of a periodic communication, a communication based on SPS, or a communication based on a CG.

At 606, the UE 602 may identify, while a second radio of the UE 602 is on, a potential communication associated with a first radio of the UE 602. The potential communication may be independent from (e.g., may not be based on) an indication received via the second radio.

In one configuration, the first radio of the UE 602 may be a main radio. The second radio of the UE 602 may be a (low power) wakeup receiver.

At 608, the UE 602 may select whether to execute the potential communication. Executing the potential communication may be associated with switching on the first radio. A single radio between the first radio and the second radio may be switched on at a time.

In one configuration, at 610, the UE 602 may switch on the first radio to execute the potential communication.

In one configuration, at 612a, the UE 602 may receive, subsequent to the executing of the potential communication at 610, an indication to switch on the second radio from a network node 604.

At 612b, the UE 602 may switch on the second radio in response to the indication at 612a to switch on the second radio.

In one configuration, at 614, the UE 602 may switch on the second radio after the first radio has been on for a preconfigured duration if no scheduling information for a further communication associated with the first radio is received via the first radio while the first radio is on for the preconfigured duration.

In one configuration, at 616a, the UE 602 may receive, via the first radio, scheduling information for a further communication associated with the first radio from a network node 604 within a preconfigured duration after the first radio is switched on.

At 616b, the UE 602 may execute the further communication via the first radio based on the scheduling information 616a.

At 616c, the UE 602 may switch on the second radio after the execution of the further communication at 616b is completed if the preconfigured duration has expired.

In one configuration, the first radio may be switched on to execute the potential communication at 610 at one preconfigured occasion in a plurality of preconfigured occasions. In one configuration, the plurality of preconfigured occasions may be associated with a periodicity or a start offset.

In one configuration, the potential communication at 610 may include an uplink transmission or a sidelink transmission.

In one configuration, the potential communication at 606 may be RRC configured. The potential communication may be associated with a preconfigured occasion.

In one configuration, at 620a, the UE 602 may select not to execute the potential communication at the preconfigured occasion.

At 620b, the UE 602 may keep the second radio on at the preconfigured occasion.

In one configuration, 622 may include 622a or 622b. At 622a, the UE 602 may switch on the first radio to execute the potential communication at the preconfigured occasion if the potential communication does not correspond to an uplink transmission where the UE 602 has no data to transmit.

At 622b, the UE 602 may keep the second radio on at the preconfigured occasion at the preconfigured occasion if the potential communication corresponds to the uplink transmission where the UE 602 has no data to transmit.

FIG. 7 is a flowchart 700 of a method of wireless communication. The method may be performed by a UE (e.g., the UE 104/350/602; the apparatus 1004). At 702, the UE may identify, while a second radio of the UE is on, a potential communication associated with a first radio of the UE. The potential communication may be independent from an indication received via the second radio. For example, 702 may be performed by the component 198 in FIG. 10. Referring to FIG. 6, at 606, the UE 602 may identify, while a second radio of the UE 602 is on, a potential communication associated with a first radio of the UE 602.

At 704, the UE may select whether to execute the potential communication. Executing the potential communication may be associated with switching on the first radio. A single radio between the first radio and the second radio may be switched on at a time. For example, 704 may be performed by the component 198 in FIG. 10. Referring to FIG. 6, at 608, the UE 602 may select whether to execute the potential communication.

Figure 8:
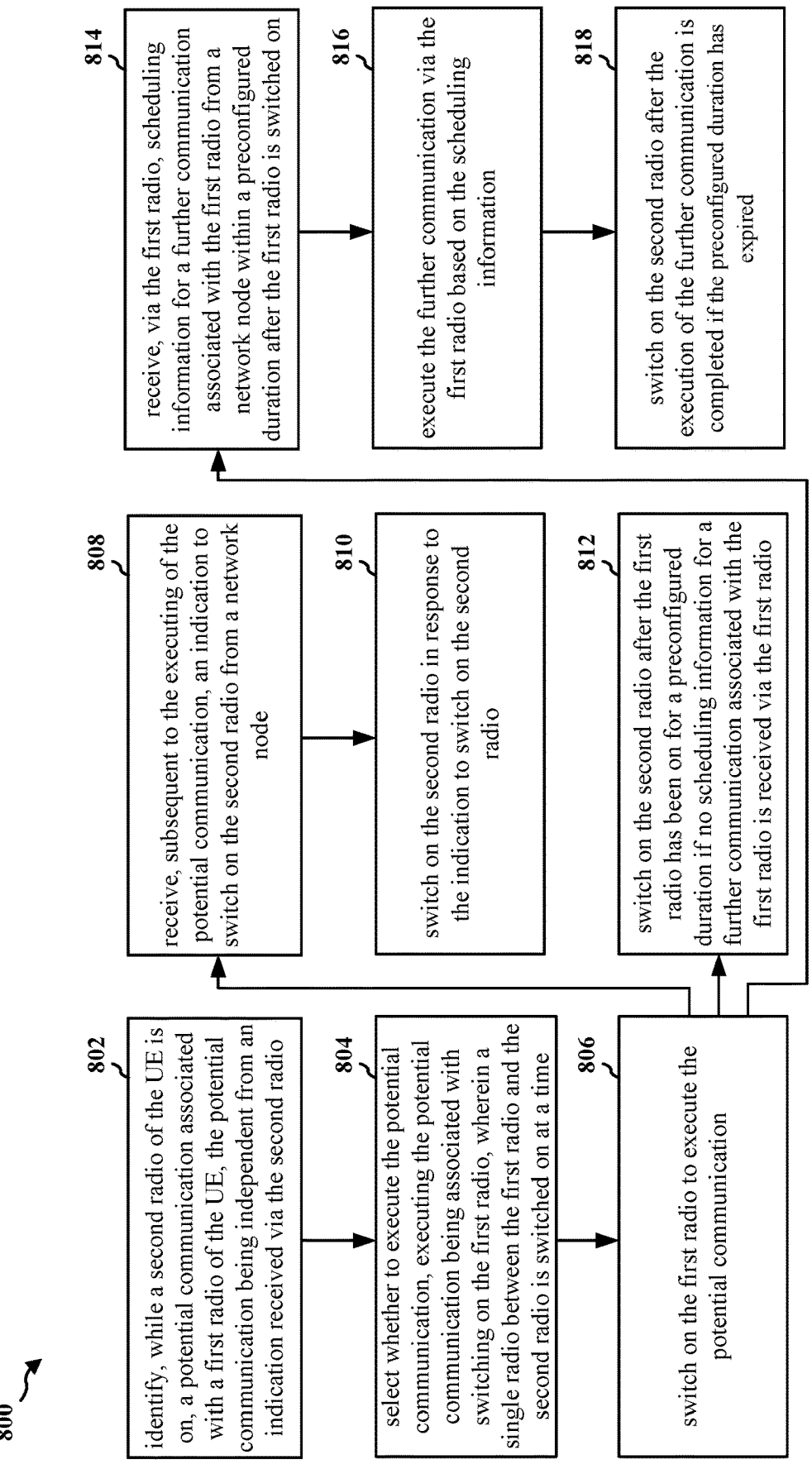
FIG. 8 is a flowchart of a method of wireless communication.

FIG. 8 is a flowchart 800 of a method of wireless communication. The method may be performed by a UE (e.g., the UE 104/350/602; the apparatus 1004). At 802, the UE may identify, while a second radio of the UE is on, a potential communication associated with a first radio of the UE. The potential communication may be independent from an indication received via the second radio. For example, 802 may be performed by the component 198 in FIG. 10. Referring to FIG. 6, at 606, the UE 602 may identify, while a second radio of the UE 602 is on, a potential communication associated with a first radio of the UE 602.

At 804, the UE may select whether to execute the potential communication. Executing the potential communication may be associated with switching on the first radio. A single radio between the first radio and the second radio may be switched on at a time. For example, 804 may be performed by the component 198 in FIG. 10. Referring to FIG. 6, at 608, the UE 602 may select whether to execute the potential communication.

In one configuration, at 806, the UE may switch on the first radio to execute the potential communication. For example, 806 may be performed by the component 198 in FIG. 10. Referring to FIG. 6, at 610, the UE 602 may switch on the first radio to execute the potential communication.

In one configuration, at 808, the UE may receive, subsequent to the executing of the potential communication, an indication to switch on the second radio from a network node. For example, 806 may be performed by the component 198 in FIG. 10. Referring to FIG. 6, at 612*a*, the UE 602 may receive, subsequent to the executing of the potential communication at 610, an indication to switch on the second radio from a network node 604.

At 810, the UE may switch on the second radio in response to the indication to switch on the second radio. For example, 810 may be performed by the component 198 in FIG. 10. Referring to FIG. 6, at 612*b*, the UE 602 may switch on the second radio in response to the indication at 612*a* to switch on the second radio.

In one configuration, at 812, the UE may switch on the second radio after the first radio has been on for a preconfigured duration if no scheduling information for a further communication associated with the first radio is received via the first radio while the first radio is on for the preconfigured duration. For example, 812 may be performed by the component 198 in FIG. 10. Referring to FIG. 6, at 614, the UE 602 may switch on the second radio after the first radio has been on for a preconfigured duration if no scheduling information for a further communication associated with the first radio is received via the first radio while the first radio is on for the preconfigured duration.

In one configuration, at 814, the UE may receive, via the first radio, scheduling information for a further communication associated with the first radio from a network node within a preconfigured duration after the first radio is switched on. For example, 814 may be performed by the component 198 in FIG. 10. Referring to FIG. 6, at 616*a*, the UE 602 may receive, via the first radio, scheduling information for a further communication associated with the first radio from a network node 604 within a preconfigured duration after the first radio is switched on.

At 816, the UE may execute the further communication via the first radio based on the scheduling information. For example, 816 may be performed by the component 198 in FIG. 10. Referring to FIG. 6, at 616*b*, the UE 602 may execute the further communication via the first radio based on the scheduling information 616*a*.

At 818, the UE may switch on the second radio after the execution of the further communication is completed if the preconfigured duration has expired. For example, 818 may be performed by the component 198 in FIG. 10. Referring to FIG. 6, at 616*c*, the UE 602 may switch on the second radio after the execution of the further communication at 616*b* is completed if the preconfigured duration has expired.

In one configuration, referring to FIG. 6, the first radio is switched on to execute the potential communication at 610 at one preconfigured occasion in a plurality of preconfigured occasions.

In one configuration, the plurality of preconfigured occasions may be associated with a periodicity or a start offset.

In one configuration, the potential communication may include an uplink transmission or a sidelink transmission.

In one configuration, referring to FIG. 6, the first radio of the UE 602 may be a main radio. The second radio of the UE 602 may be a wakeup receiver.

Figure 9:
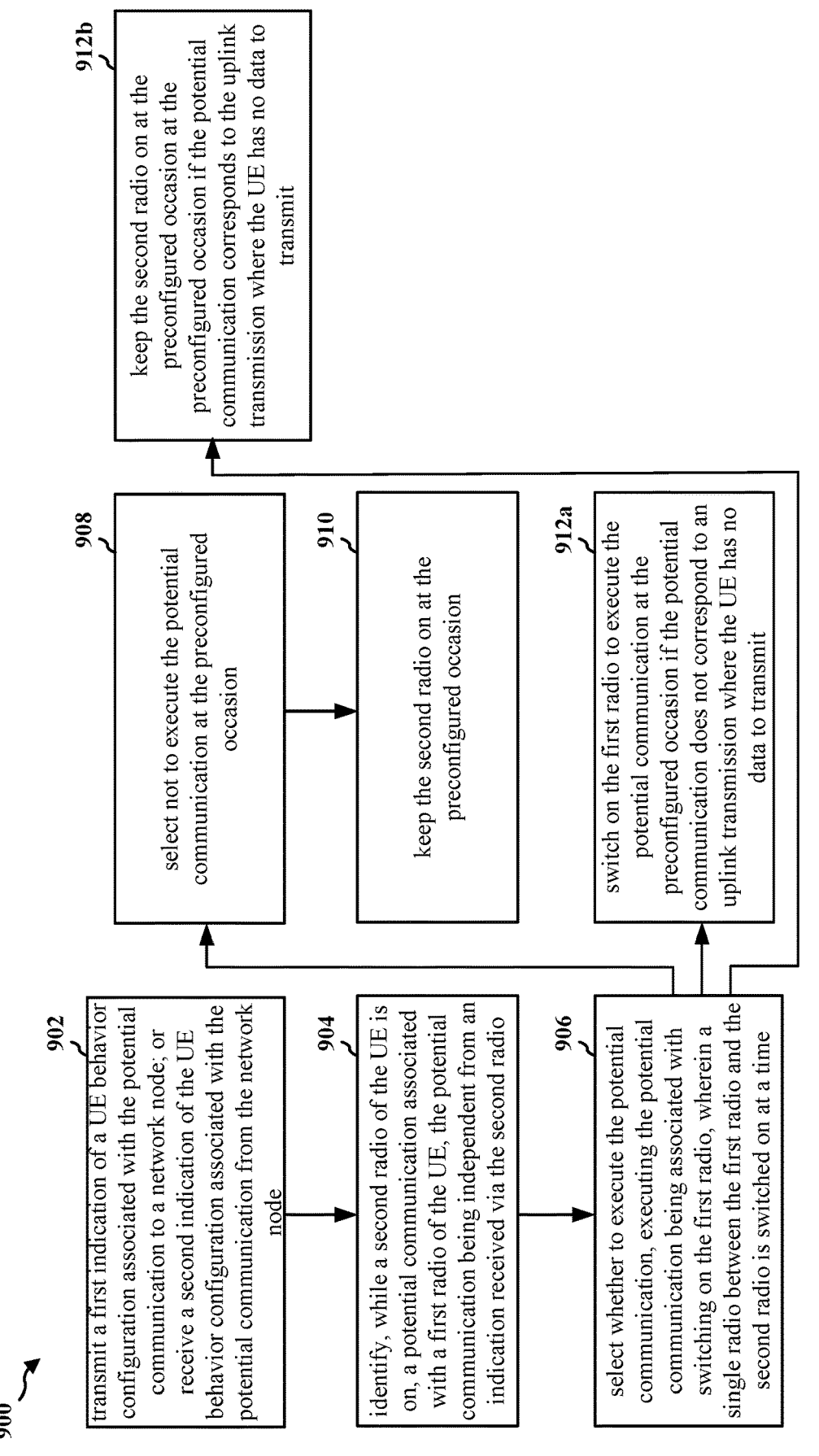
FIG. 9 is a flowchart of a method of wireless communication.

FIG. 9 is a flowchart 900 of a method of wireless communication. The method may be performed by a UE (e.g., the UE 104/350/602; the apparatus 1004). At 904, the UE may identify, while a second radio of the UE is on, a potential communication associated with a first radio of the UE. The potential communication may be independent from an indication received via the second radio. For example, 904 may be performed by the component 198 in FIG. 10. Referring to FIG. 6, at 606, the UE 602 may identify, while a second radio of the UE 602 is on, a potential communication associated with a first radio of the UE 602.

At 906, the UE may select whether to execute the potential communication. Executing the potential communication may be associated with switching on the first radio. A single radio between the first radio and the second radio may be switched on at a time. For example, 906 may be performed by the component 198 in FIG. 10. Referring to FIG. 6, at 608, the UE 602 may select whether to execute the potential communication.

In one configuration, the potential communication may be RRC configured. The potential communication may be associated with a preconfigured occasion.

In one configuration, at 908, the UE may select not to execute the potential communication at the preconfigured occasion. For example, 908 may be performed by the component 198 in FIG. 10. Referring to FIG. 6, at 620*a*, the UE 602 may select not to execute the potential communication at the preconfigured occasion.

At 910, the UE may keep the second radio on at the preconfigured occasion. For example, 910 may be performed by the component 198 in FIG. 10. Referring to FIG. 6, at 620*b*, the UE 602 may keep the second radio on at the preconfigured occasion.

In one configuration, at 912*a*, the UE may switch on the first radio to execute the potential communication at the preconfigured occasion if the potential communication does not correspond to an uplink transmission where the UE has no data to transmit. For example, 912*a* may be performed by the component 198 in FIG. 10. Referring to FIG. 6, at 622*a*, the UE 602 may switch on the first radio to execute the potential communication at the preconfigured occasion if the potential communication does not correspond to an uplink transmission where the UE 602 has no data to transmit.

At 912*b*, the UE may keep the second radio on at the preconfigured occasion at the preconfigured occasion if the potential communication corresponds to the uplink transmission where the UE has no data to transmit. For example, 912*b* may be performed by the component 198 in FIG. 10. Referring to FIG. 6, at 622*b*, the UE 602 may keep the second radio on at the preconfigured occasion at the preconfigured occasion if the potential communication corresponds to the uplink transmission where the UE 602 has no data to transmit.

In one configuration, at 902, the UE may transmit a first indication of a UE behavior configuration associated with the potential communication to a network node, or may receive a second indication of the UE behavior configuration associated with the potential communication from the network node. For example, 902 may be performed by the component 198 in FIG. 10. Referring to FIG. 6, at 618, the UE 602 may transmit a first indication of a UE behavior configuration associated with the potential communication to a network node 604, or may receive a second indication of the UE behavior configuration associated with the potential communication from the network node 604.

In one configuration, referring to FIG. 6, the UE behavior configuration at 618 may be associated with all communications associated with the UE that are RRC configured.

In one configuration, referring to FIG. 6, the UE behavior configuration at 618 may be associated with one or more individual communications associated with the UE that are RRC configured.

In one configuration, the potential communication may be one of a periodic communication, a communication based on SPS, or a communication based on a CG.

In one configuration, referring to FIG. 6, the first radio of the UE 602 may be a main radio. The second radio of the UE 602 may be a wakeup receiver.

Figure 10:
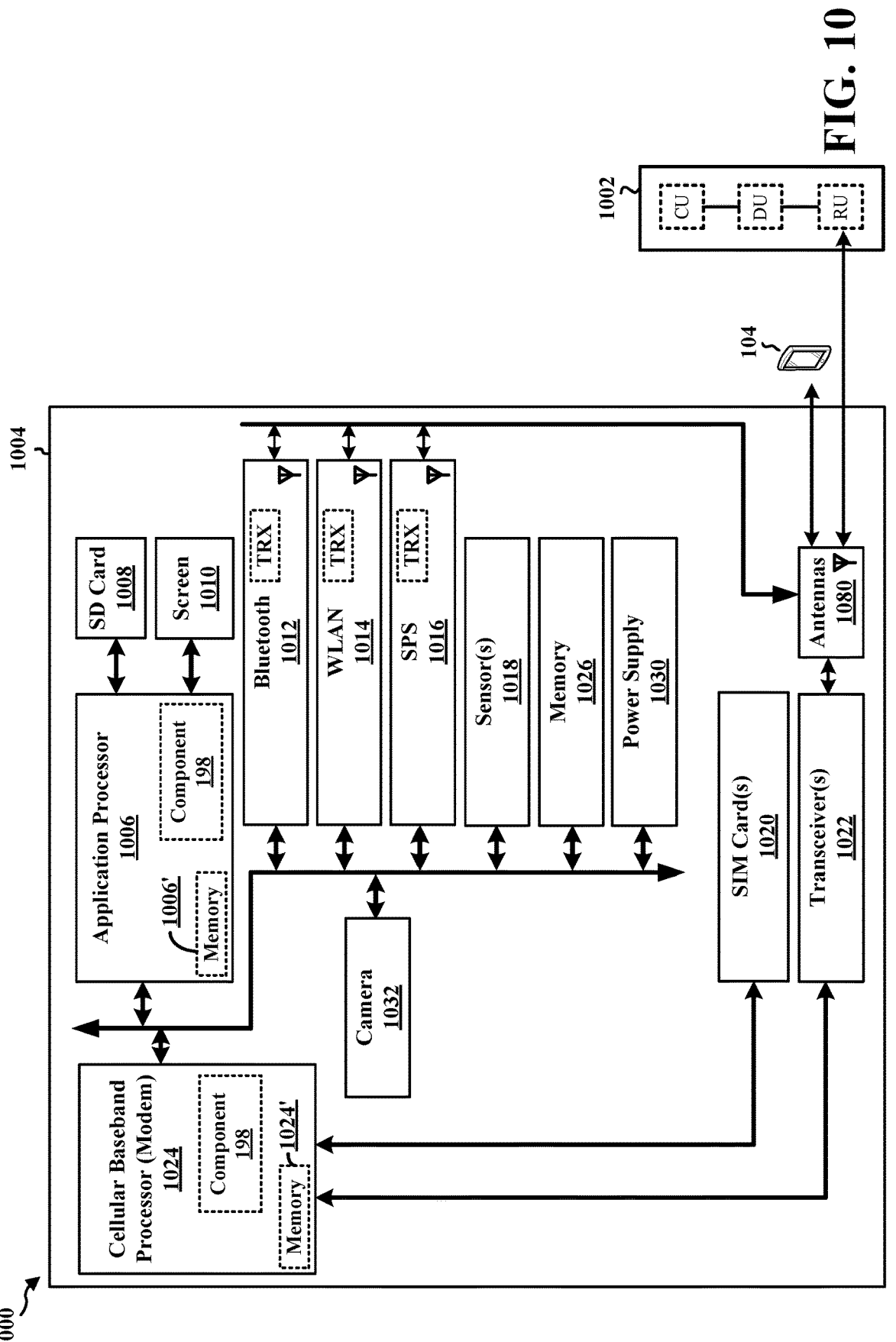
FIG. 10 is a diagram illustrating an example of a hardware implementation for an example apparatus and/or network entity.

FIG. 10 is a diagram 1000 illustrating an example of a hardware implementation for an apparatus 1004. The apparatus 1004 may be a UE, a component of a UE, or may implement UE functionality. In some aspects, the apparatus 1004 may include a cellular baseband processor 1024 (also referred to as a modem) coupled to one or more transceivers 1022 (e.g., cellular RF transceiver). The cellular baseband processor 1024 may include on-chip memory 1024'. In some aspects, the apparatus 1004 may further include one or more subscriber identity modules (SIM) cards 1020 and an application processor 1006 coupled to a secure digital (SD) card 1008 and a screen 1010. The application processor 1006 may include on-chip memory 1006'. In some aspects, the apparatus 1004 may further include a Bluetooth module 1012, a WLAN module 1014, an SPS module 1016 (e.g., GNSS module), one or more sensor modules 1018 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1026, a power supply 1030, and/or a camera 1032. The Bluetooth module 1012, the WLAN module 1014, and the SPS module 1016 may include an on-chip transceiver (TRX) (or in some cases, just a receiver (RX)). The Bluetooth module 1012, the WLAN module 1014, and the SPS module 1016 may include their own dedicated antennas and/or utilize the antennas 1080 for communication. The cellular baseband processor 1024 communicates through the transceiver(s) 1022 via one or more antennas 1080 with the UE 104 and/or with an RU associated with a network entity 1002. The cellular baseband processor 1024 and the application processor 1006 may each include a computer-readable medium/memory 1024', 1006', respectively. The additional memory modules 1026 may also be considered a computer-readable medium/memory. Each computer-readable medium/memory 1024', 1006', 1026 may be non-transitory. The cellular baseband processor 1024 and the application processor 1006 are each responsible for general processing, including the execution of software stored on the computer-readable medium/memory. The software, when executed by the cellular baseband processor 1024/application processor 1006, causes the cellular baseband processor 1024/application processor 1006 to perform the various functions described supra. The computer-readable medium/memory may also be used for storing data that is manipulated by the cellular baseband processor 1024/application processor 1006 when executing software. The cellular baseband processor 1024/application processor 1006 may be a component of the UE 350 and may include the memory 360 and/or at least one of the TX processor 368, the RX processor 356, and the controller/processor 359. In one configuration, the apparatus 1004 may be a processor chip (modem and/or application) and include just the cellular baseband processor 1024 and/or the application processor 1006, and in another configuration, the apparatus 1004 may be the entire UE (e.g., see 350 of FIG. 3) and include the additional modules of the apparatus 1004.

As discussed supra, the component 198 is configured to identify, while a second radio of the UE is on, a potential communication associated with a first radio of the UE. The potential communication may be independent from an indication received via the second radio. The component 198 may be configured to select whether to execute the potential communication. Executing the potential communication may be associated with switching on the first radio. A single radio between the first radio and the second radio may be switched on at a time. The component 198 may be within the cellular baseband processor 1024, the application processor 1006, or both the cellular baseband processor 1024 and the application processor 1006. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1004 may include a variety of components configured for various functions. In one configuration, the apparatus 1004, and in particular the cellular baseband processor 1024 and/or the application processor 1006, includes means for identifying, while a second radio of the UE is on, a potential communication associated with a first radio of the UE. The potential communication may be independent from an indication received via the second radio. The apparatus 1004, and in particular the cellular baseband processor 1024 and/or the application processor 1006, includes means for selecting whether to execute the potential communication. Executing the potential communication may be associated with switching on the first radio. A single radio between the first radio and the second radio may be switched on at a time.

In one configuration, the apparatus 1004, and in particular the cellular baseband processor 1024 and/or the application processor 1006, includes means for switching on the first radio to execute the potential communication. In one configuration, the apparatus 1004, and in particular the cellular baseband processor 1024 and/or the application processor 1006, includes means for receiving, subsequent to the executing of the potential communication, an indication to switch on the second radio from a network node. The apparatus 1004, and in particular the cellular baseband processor 1024 and/or the application processor 1006, includes means for switching on the second radio in response to the indication to switch on the second radio. In one configuration, the apparatus 1004, and in particular the cellular baseband processor 1024 and/or the application processor 1006, includes means for switching on the second radio after the first radio has been on for a preconfigured duration if no scheduling information for a further communication associated with the first radio is received via the first radio while the first radio is on for the preconfigured duration. In one configuration, the apparatus 1004, and in particular the cellular baseband processor 1024 and/or the application processor 1006, includes means for receiving, via the first radio, scheduling information for a further communication associated with the first radio from a network node within a preconfigured duration after the first radio is switched on. The apparatus 1004, and in particular the cellular baseband processor 1024 and/or the application processor 1006, includes means for executing the further communication via the first radio based on the scheduling information. The apparatus 1004, and in particular the cellular baseband processor 1024 and/or the application processor 1006, includes means for switching on the second radio after the execution of the further communication is completed if the preconfigured duration has expired. In one configuration, the first radio may be switched on to execute the potential communication at one preconfigured occasion in a plurality of preconfigured occasions. In one configuration, the plurality of preconfigured occasions may be associated with a periodicity or a start offset. In one configuration, the potential communication may include an uplink transmission or a sidelink transmission. In one configuration, the potential communication may be RRC configured. The potential communication may be associated with a preconfigured occasion. In one configuration, the apparatus 1004, and in particular the cellular baseband processor 1024 and/or the application processor 1006, includes means for selecting not to execute the potential communication at the preconfigured occasion. The apparatus 1004, and in particular the cellular baseband processor 1024 and/or the application processor 1006, includes means for keeping the second radio on at the preconfigured occasion. In one configuration, the apparatus 1004, and in particular the cellular baseband processor 1024 and/or the application processor 1006, includes means for switching on the first radio to execute the potential communication at the preconfigured occasion if the potential communication does not correspond to an uplink transmission where the UE has no data to transmit. The apparatus 1004, and in particular the cellular baseband processor 1024 and/or the application processor 1006, includes means for keeping the second radio on at the preconfigured occasion at the preconfigured occasion if the potential communication corresponds to the uplink transmission where the UE has no data to transmit. In one configuration, the apparatus 1004, and in particular the cellular baseband processor 1024 and/or the application processor 1006, includes means for transmitting a first indication of a UE behavior configuration associated with the potential communication to a network node, or means for receiving a second indication of the UE behavior configuration associated with the potential communication from the network node. In one configuration, the UE behavior configuration may be associated with all communications associated with the UE that are RRC configured. In one configuration, the UE behavior configuration may be associated with one or more individual communications associated with the UE that are RRC configured. In one configuration, the potential communication may be one of a periodic communication, a communication based on SPS, or a communication based on a CG. In one configuration, the first radio of the UE may be a main radio. The second radio of the UE may be a wakeup receiver.

The means may be the component 198 of the apparatus 1004 configured to perform the functions recited by the means. As described supra, the apparatus 1004 may include the TX processor 368, the RX processor 356, and the controller/processor 359. As such, in one configuration, the means may be the TX processor 368, the RX processor 356, and/or the controller/processor 359 configured to perform the functions recited by the means.

Referring back to FIGS. 4-10, a UE may identify, while a second radio of the UE is on, a potential communication associated with a first radio of the UE. The potential communication may be independent from an indication received via the second radio. The UE may select whether to execute the potential communication. Executing the potential communication may be associated with switching on the first radio. A single radio between the first radio and the second radio may be switched on at a time. The first radio of the UE may be a main radio. The second radio of the UE may be a wakeup receiver. Accordingly, collisions between WUS monitoring and wireless communications via the main radio may be resolved based on one or more factors and/or criteria. Further, the power savings associated with the low power wakeup receiver architecture may be realized.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including identifying, while a second radio of the UE is on, a potential communication associated with a first radio of the UE, the potential communication being independent from an indication received via the second radio; and selecting whether to execute the potential communication, executing the potential communication being associated with switching on the first radio, where a single radio between the first radio and the second radio is switched on at a time.

Aspect 2 is the method of aspect 1, further including: switching on the first radio to execute the potential communication.

Aspect 3 is the method of aspect 2, further including: receiving, subsequent to the executing of the potential communication, an indication to switch on the second radio from a network node; and switching on the second radio in response to the indication to switch on the second radio.

Aspect 4 is the method of aspect 2, further including: switching on the second radio after the first radio has been on for a preconfigured duration if no scheduling information for a further communication associated with the first radio is received via the first radio while the first radio is on for the preconfigured duration.

Aspect 5 is the method of aspect 2, further including: receiving, via the first radio, scheduling information for a further communication associated with the first radio from a network node within a preconfigured duration after the first radio is switched on; executing the further communication via the first radio based on the scheduling information; and switching on the second radio after the execution of the further communication is completed if the preconfigured duration has expired.

Aspect 6 is the method of aspect 2, where the first radio is switched on to execute the potential communication at one preconfigured occasion in a plurality of preconfigured occasions.

Aspect 7 is the method of aspect 6, where the plurality of preconfigured occasions is associated with a periodicity or a start offset.

Aspect 8 is the method of any of aspects 2 to 7, where the potential communication includes an uplink transmission or a sidelink transmission.

Aspect 9 is the method of aspect 1, where the potential communication is RRC configured, and the potential communication is associated with a preconfigured occasion.

Aspect 10 is the method of aspect 9, further including: selecting not to execute the potential communication at the preconfigured occasion; and keeping the second radio on at the preconfigured occasion.

Aspect 11 is the method of aspect 9, further including: switching on the first radio to execute the potential communication at the preconfigured occasion if the potential communication does not correspond to an uplink transmission where the UE has no data to transmit; or keeping the second radio on at the preconfigured occasion at the preconfigured occasion if the potential communication corresponds to the uplink transmission where the UE has no data to transmit.

Aspect 12 is the method of any of aspects 9 to 11, further including: transmitting a first indication of a UE behavior configuration associated with the potential communication to a network node; or receiving a second indication of the UE behavior configuration associated with the potential communication from the network node.

Aspect 13 is the method of aspect 12, where the UE behavior configuration is associated with all communications associated with the UE that are RRC configured.

Aspect 14 is the method of aspect 12, where the UE behavior configuration is associated with one or more individual communications associated with the UE that are RRC configured.

Aspect 15 is the method of any of aspects 9 to 14, where the potential communication is one of a periodic communication, a communication based on SPS, or a communication based on a CG.

Aspect 16 is the method of any of aspects 1 to 15, where the first radio of the UE is a main radio, and the second radio of the UE is a wakeup receiver.

Aspect 17 is an apparatus for wireless communication including at least one processor coupled to a memory and, based at least in part on information stored in the memory, the at least one processor is configured to implement a method as in any of aspects 1 to 16.

Aspect 18 may be combined with aspect 17 and further includes a transceiver coupled to the at least one processor.

Aspect 19 is an apparatus for wireless communication including means for implementing any of aspects 1 to 16.

Aspect 20 is a non-transitory computer-readable storage medium storing computer executable code, where the code when executed by a processor causes the processor to implement any of aspects 1 to 16.

Various aspects have been described herein. These and other aspects are within the scope of the following claims.

What is claimed is:

1. An apparatus for wireless communication at a user equipment (UE), comprising:

memory; and at least one processor coupled to the memory and, based at least in part on information stored in the memory, the at least one processor is configured to:

identify, while a second radio of the UE is on, a scheduled communication associated with a first radio of the UE, wherein the scheduled communication is independent from an indication via the second radio, wherein the first radio corresponds to a main radio and the second radio corresponds to a low power wake up receiver; and execute the scheduled communication without reception of the indication, wherein an execution of the scheduled communication is within a preconfigured duration after switching on the first radio, wherein one of the first radio or the second radio is switched on at a time.

2. The apparatus of claim 1, the at least one processor being further configured to:

switch on the first radio to execute the scheduled communication.

3. The apparatus of claim 2, the at least one processor being further configured to:

receive, subsequent to the execution of the scheduled communication, an indication to switch on the second radio from a network node; and switch on the second radio in response to the indication to switch on the second radio.

4. The apparatus of claim 2, the at least one processor being further configured to:

switch on the second radio after the first radio has been on for the preconfigured duration based on no reception of scheduling information for a further communication associated with the first radio via the first radio while the first radio is on for the preconfigured duration.

5. The apparatus of claim 2, the at least one processor being further configured to:

receive, via the first radio, scheduling information for a further communication associated with the first radio from a network node within the preconfigured duration after the first radio is switched on;

execute the further communication via the first radio based on the scheduling information; and switch on the second radio after the execution of the further communication is completed if the preconfigured duration has expired.

6. The apparatus of claim 2, the at least one processor being further configured to switch on the first radio to execute the scheduled communication at one preconfigured occasion in a plurality of preconfigured occasions.

7. The apparatus of claim 6, wherein the plurality of preconfigured occasions is associated with a periodicity or a start offset.

8. The apparatus of claim 2, wherein the scheduled communication includes an uplink transmission or a sidelink transmission.

9. The apparatus of claim 1, wherein the scheduled communication is radio resource control (RRC) configured, and the scheduled communication is associated with a preconfigured occasion.

10. The apparatus of claim 9, the at least one processor being further configured to:

select not to execute the scheduled communication at the preconfigured occasion; and keep the second radio on at the preconfigured occasion.

11. The apparatus of claim 9, the at least one processor being further configured to:

switch on the first radio to execute the scheduled communication at the preconfigured occasion if the scheduled communication does not correspond to an uplink transmission where the UE has no data to transmit; or keep the second radio on at the preconfigured occasion if the scheduled communication corresponds to the uplink transmission where the UE has no data to transmit.

12. The apparatus of claim 9, the at least one processor being further configured to:

transmit a first indication of a UE behavior configuration associated with the scheduled communication to a network node; or receive a second indication of the UE behavior configuration associated with the scheduled communication from the network node.

13. The apparatus of claim 12, wherein the UE behavior configuration is associated with all communications associated with the UE that are RRC configured.

14. The apparatus of claim 12, wherein the UE behavior configuration is associated with one or more individual communications associated with the UE that are RRC configured.

15. The apparatus of claim 9, wherein the scheduled communication is one of a periodic communication, a communication based on semi-persistent scheduling (SPS), or a communication based on a configured grant (CG).

16. The apparatus of claim 1, wherein the indication corresponds to a wakeup signal associated with the second radio, and wherein the preconfigured duration corresponds to a discontinuous reception (DRX) on duration.

17. The apparatus of claim 1, further comprising a transceiver coupled to the at least one processor.

18. A method of wireless communication at a user equipment (UE), comprising:

identifying, while a second radio of the UE is on, a scheduled communication associated with a first radio of the UE, wherein the scheduled communication is independent from an indication via the second radio, wherein the first radio corresponds to a main radio and the second radio corresponds to a low power wake up receiver; and executing the scheduled communication without reception of the indication, wherein an execution of the scheduled communication is within a preconfigured duration after switching on the first radio, wherein one of the first radio or the second radio is switched on at a time.

19. The method of claim 18, further comprising:

switching on the first radio to execute the scheduled communication.

20. The method of claim 19, further comprising:

receiving, subsequent to the execution of the scheduled communication, an indication to switch on the second radio from a network node; and switching on the second radio in response to the indication to switch on the second radio.

21. The method of claim 19, further comprising:

switching on the second radio after the first radio has been on for the preconfigured duration based on no reception of scheduling information for a further communication associated with the first radio via the first radio while the first radio is on for the preconfigured duration.

22. The method of claim 19, further comprising:

receiving, via the first radio, scheduling information for a further communication associated with the first radio from a network node within the preconfigured duration after the first radio is switched on;

executing the further communication via the first radio based on the scheduling information; and switching on the second radio after the execution of the further communication is completed if the preconfigured duration has expired.

23. The method of claim 19, wherein the first radio is switched on to execute the scheduled communication at one preconfigured occasion in a plurality of preconfigured occasions.

24. The method of claim 23, wherein the plurality of preconfigured occasions is associated with a periodicity or a start offset.

25. The method of claim 19, wherein the scheduled communication includes an uplink transmission or a sidelink transmission.

26. The method of claim 18, wherein the scheduled communication is radio resource control (RRC) configured, and the scheduled communication is associated with a preconfigured occasion.

27. The method of claim 26, further comprising:
    selecting not to execute the scheduled communication at the preconfigured occasion; and
    keeping the second radio on at the preconfigured occasion.

28. The method of claim 26, further comprising:
    switching on the first radio to execute the scheduled communication at the preconfigured occasion if the scheduled communication does not correspond to an uplink transmission where the UE has no data to transmit; or
    keeping the second radio on at the preconfigured occasion at the preconfigured occasion if the scheduled communication corresponds to the uplink transmission where the UE has no data to transmit.

29. An apparatus for wireless communication at a user equipment (UE), comprising:

means for identifying, while a second radio of the UE is on, a scheduled communication associated with a first radio of the UE, wherein the scheduled communication is independent from an indication received via the second radio, wherein the first radio corresponds to a main radio and the second radio corresponds to a low power wake up receiver; and means for executing the scheduled communication without reception of the indication, wherein an execution of the scheduled communication is within a preconfigured duration after switching on the first radio, wherein one of the first radio or the second radio is switched on at a time.

30. A non-transitory computer-readable medium storing computer executable code at a user equipment (UE), the code when executed by a processor causes the processor to:
    identify, while a second radio of the UE is on, a scheduled communication associated with a first radio of the UE, wherein the scheduled communication is independent from an indication received via the second radio, wherein the first radio corresponds to a main radio and the second radio corresponds to a low power wake up receiver; and
    execute the scheduled communication without reception of the indication, wherein an execution of the scheduled communication is within a preconfigured duration after switching on the first radio, wherein one of the first radio or the second radio is switched on at a time.

* * * * *